United States Patent
Otsuka (10) Patent No.: US 10,124,423 B2
(45) Date of Patent: Nov. 13, 2018

(54) ROTARY CUTTING TOOL HAVING ADJACENT CUTTING INSERTS WITH WAVE-SHAPED EDGES AND OVERLAPPING ROTATIONAL TRAJECTORIES COINCIDING IN PHASE

(71) Applicant: TUNGALOY CORPORATION, Iwaki-shi, Fukushima (JP)

(72) Inventor: Jun Otsuka, Iwaki (JP)

(73) Assignee: TUNGALOY CORPORATION, Iwaki-shi, Fukushima (JP)

(*) Notice: Subject to any disclaimer, the term of this patent is extended or adjusted under 35 U.S.C. 154(b) by 113 days.

(21) Appl. No.: 15/312,755

(22) PCT Filed: Jul. 13, 2015

(86) PCT No.: PCT/JP2015/070057
§ 371 (c)(1),
(2) Date: Nov. 21, 2016

(87) PCT Pub. No.: WO2016/009995
PCT Pub. Date: Jan. 21, 2016

(65) Prior Publication Data
US 2017/0189974 A1 Jul. 6, 2017

(30) Foreign Application Priority Data

Jul. 14, 2014 (JP) .................................. 2014-143780

(51) Int. Cl.
*B23C 5/02* (2006.01)
*B23C 5/10* (2006.01)
*B23C 5/20* (2006.01)

(52) U.S. Cl.
CPC ................ *B23C 5/109* (2013.01); *B23C 5/10* (2013.01); *B23C 5/20* (2013.01);
(Continued)

(58) Field of Classification Search
CPC ..... B23C 2200/0411; B23C 2200/0477; B23C 2200/165; B23C 2210/168;
(Continued)

(56) References Cited

U.S. PATENT DOCUMENTS 4,645,384 A * 2/1987 Shimomura ............ B23C 5/207
407/113
4,844,666 A * 7/1989 Tsujimura ............... B23C 5/003
407/34
(Continued)

FOREIGN PATENT DOCUMENTS

JP H 08-039308 A 2/1996
JP 2013-202770 A 10/2013

OTHER PUBLICATIONS

International Search Report dated Aug. 18, 2015 issued in counterpart International (PCT) Application (No. PCT/JP2015/070057).
(Continued)

*Primary Examiner* — Nicole N Ramos
(74) *Attorney, Agent, or Firm* — Studebaker & Brackett PC (57) ABSTRACT

A rotary cutting tool has a plurality of circumferentially spaced grooves, each having a plurality of cutting inserts mounted. Each cutting insert has a wave-shaped major cutting edge, a corner cutting edge, and a minor cutting edge. The cutting inserts are arranged such that, the phases of the waves of the rotational trajectories formed by the cutting inserts that are adjacent to each other in a direction along the tool rotational axis coincide with each other in one groove. Also, the rotational trajectories of at least part of cutting edge portions of at least some cutting inserts are overlapped with each other in the direction of the tool rotational axis. Accordingly, even when the cutting edge portion is used as a major cutting edge and as an inner cutting edge, it is still possible to reduce cutting load and suppress breakage.

14 Claims, 10 Drawing Sheets

(52) U.S. Cl.
CPC ............... *B23C 2200/0477* (2013.01); *B23C 2200/206* (2013.01); *B23C 2210/28* (2013.01); *B23C 2220/60* (2013.01)

(58) Field of Classification Search
CPC . B23C 2220/60; B23C 2265/40; B23C 5/109; B23C 5/2221; B23C 5/003; B23C 5/2208; B23C 5/006; Y10T 407/1948; Y10T 407/1936; Y10T 407/1934
See application file for complete search history.

(56) References Cited

U.S. PATENT DOCUMENTS

| | | | |
|---|---|---|---|
| 4,936,719 A | 6/1990 | Peters | |
| 5,542,792 A * | 8/1996 | Krueger | B23B 31/1074 |
| | | | 407/35 |
| 5,586,843 A * | 12/1996 | Minicozzi | B23C 5/109 |
| | | | 407/113 |
| 5,904,449 A * | 5/1999 | Satran | B23C 5/202 |
| | | | 407/113 |
| 5,913,644 A * | 6/1999 | DeRoche | B23C 5/109 |
| | | | 407/42 |
| 6,692,197 B2 * | 2/2004 | Villa | B23C 5/109 |
| | | | 407/35 |
| 8,246,278 B2 * | 8/2012 | Horiike | B23C 5/109 |
| | | | 407/113 |
| 8,613,574 B2 * | 12/2013 | Waggle | B23C 5/003 |
| | | | 407/59 |
| 9,505,066 B2 * | 11/2016 | Francis | B23C 5/109 |
| 2010/0061813 A1 | 3/2010 | Horiike et al. | |
| 2012/0051851 A1 * | 3/2012 | Saito | B23C 5/109 |
| | | | 407/42 |
| 2012/0070242 A1 | 3/2012 | Choi et al. | |

OTHER PUBLICATIONS

Written Opinion dated Aug. 18, 2015 issued in counterpart International (PCT) Application (No. PCT/JP2015/070057).

* cited by examiner

ROTARY CUTTING TOOL HAVING ADJACENT CUTTING INSERTS WITH WAVE-SHAPED EDGES AND OVERLAPPING ROTATIONAL TRAJECTORIES COINCIDING IN PHASE

RELATED APPLICATIONS

This is a 371 US National Phase of International Patent Application No. PCT/JP2015/070057 filed Jul. 13, 2015, and published as WO 2016/009995A1 on Jan. 21, 2016, which claims priority to JP 2014-143780, filed Jul. 14, 2015. The contents of the aforementioned applications are incorporated by reference in their entirety.

TECHNICAL FIELD

The present invention relates to an indexable rotary cutting tool. More specifically, the present invention relates to an indexable rotary cutting tool in the form of a roughing cutter on which a plurality of cutting inserts is removably mounted.

BACKGROUND ART

Conventionally, there has been an indexable rotary cutting tool having a cylindrical tool body provided with a plurality of grooves extending from its proximal end toward its distal end in a peripheral surface of the tool body, each groove being configured to allow a plurality of cutting inserts to be removably mounted therein in a direction of the tool rotational axis. In general, the rotary cutting tool having such shape is called a roughing cutter. In the roughing cutter, since the plurality of cutting inserts is aligned in the direction of tool rotational axis, a substantial length of the cutting edges is large and the tool can therefore form large depth of cut. Accordingly, highly efficient machining can be achieved.

Patent Document 1 discloses a roughing cutter on which quadrangular cutting inserts each having a cutting edge having a wave shape in a side view are mounted. The cutting inserts are arranged such that: in a relationship in each groove, they are aligned with an interval therebetween in an axial direction; and in a relationship between the plurality of grooves, the cutting edges having a wave shape that are aligned in the axial direction form consecutive rows of cutting edges in a rotational trajectory around the axis. Patent Document 1 states that the wave shape cutting edges cause chips to be separated into smaller pieces than the length of the cutting edge, and therefore the disposal capacity of the chips can be improved.

CITATION LIST

Patent Document

Patent Document 1: JP2008-068345 A

SUMMARY

Technical Problem

In recent years, some roughing cutters have employed triangular cutting inserts. A positive-type triangular cutting insert has one more available corner as compared to the conventional quadrangular cutting insert, and is therefore economically efficient. However, when a roughing cutter employing such triangular cutting inserts is used to perform cutting involving a feed motion in the axial direction of the tool (such as ramp cutting), the arrangement of cutting inserts as disclosed in Patent Document 1 will cause the following problem. In a triangular cutting insert, an inner cutting edge used for ramp cutting or the like constitutes part of a major cutting edge. The "inner cutting edge" is a cutting edge that does not have any function during a normal lateral feeding but is used when the tool is fed also in the axial direction of the tool, as in the ramp cutting. In general, the inner cutting edge is provided on the side opposite to a side, with which a corner cutting edge is connected, of a minor cutting edge involved in cutting, in a state in which the cutting inserts are attached to the tool body.

Accordingly, in the cutting inserts attached closest to the distal end of the roughing cutter, only part of the cutting edge portions is used as the "inner cutting edge" and also as the "major cutting edge." Thus, the arrangement disclosed in cited reference 1 will cause quite a large load on such cutting edge portions serving both as the inner cutting edges and the major cutting edges and such cutting edge portions will be prone to fracture. This problem may occur not only in the triangular cutting inserts but also in all types of cutting inserts which use part of their major cutting edges as inner cutting edges.

The present invention has been made in light of the above problem and an object of the present invention is to provide an indexable cutting tool in the form of a roughing cutter that, even when cutting inserts having wave shape cutting edges and having cutting edge portions, being part of its major cutting edges, serving also as inner cutting edges are mounted on the indexable cutting tool, is capable of suppressing breakages in such cutting edge portions.

Solution to Problem

The present invention provides an indexable rotary cutting tool (10) comprising: a substantially cylindrical tool body (20) having a rotational axis (O); and cutting inserts (30) mounted on the tool body (20), in which a plurality of grooves (27) is formed in a peripheral surface (23) of the tool body (20), a plurality of insert seats (28) is formed in the grooves (27), and the cutting inserts (30) are removably arranged onto the insert seats (27), wherein: the cutting inserts (30) each have a rake surface (31) and a flank (33) intersecting with the rake surface (31), and a major cutting edge (34), a corner cutting edge (37) connected to the major cutting edge (34), and a minor cutting edge (35) connected to the corner cutting edge (37), are formed in an intersecting edge between the rake surface (31) and the flank (33); the major cutting edge (34) is formed in a wave shape as viewed from a direction facing the rake surface (31) and the cutting inserts (30) are arranged such that, in rotational trajectories formed by the major cutting edges (34) of the respective cutting inserts (30) when the indexable rotary cutting tool (10) is rotated around the rotational axis (O), phases of waves of rotational trajectories formed by cutting inserts (30) that are adjacent to each other in a direction along the rotational axis (O) in one groove (27) coincide with each other, and such that at least some of the cutting inserts (30) are arranged such that, from among the rotational trajectories formed by the major cutting edges (34), rotational trajectories formed by part of cutting edge portions are overlapped with each other in a direction of the rotational axis (O).

Advantageous Effects of Invention

According to the present invention, in the indexable rotary cutting tool (10) using the cutting inserts (30) having wave shape major cutting edges, since part of cutting edge portions of the respective major cutting edges of adjacent cutting inserts (30) form the same rotational trajectory, the cutting load per cutting edge is reduced. Accordingly, even when part of the cutting edge portions of the major cutting edges are used also as inner cutting edges, it is possible to greatly suppress fracture in such cutting edge portions.

DESCRIPTION OF EMBODIMENTS

Embodiments of the present invention will now be described in detail with reference to the attached drawings. Although the expressions such as "upper," "lower," "front" and "back" may be used in the following description, such expressions are used to aid in easier understanding of the description and are intended to limit neither the absolute positional relationships in a space nor the scope of the present invention.

Figure 1:
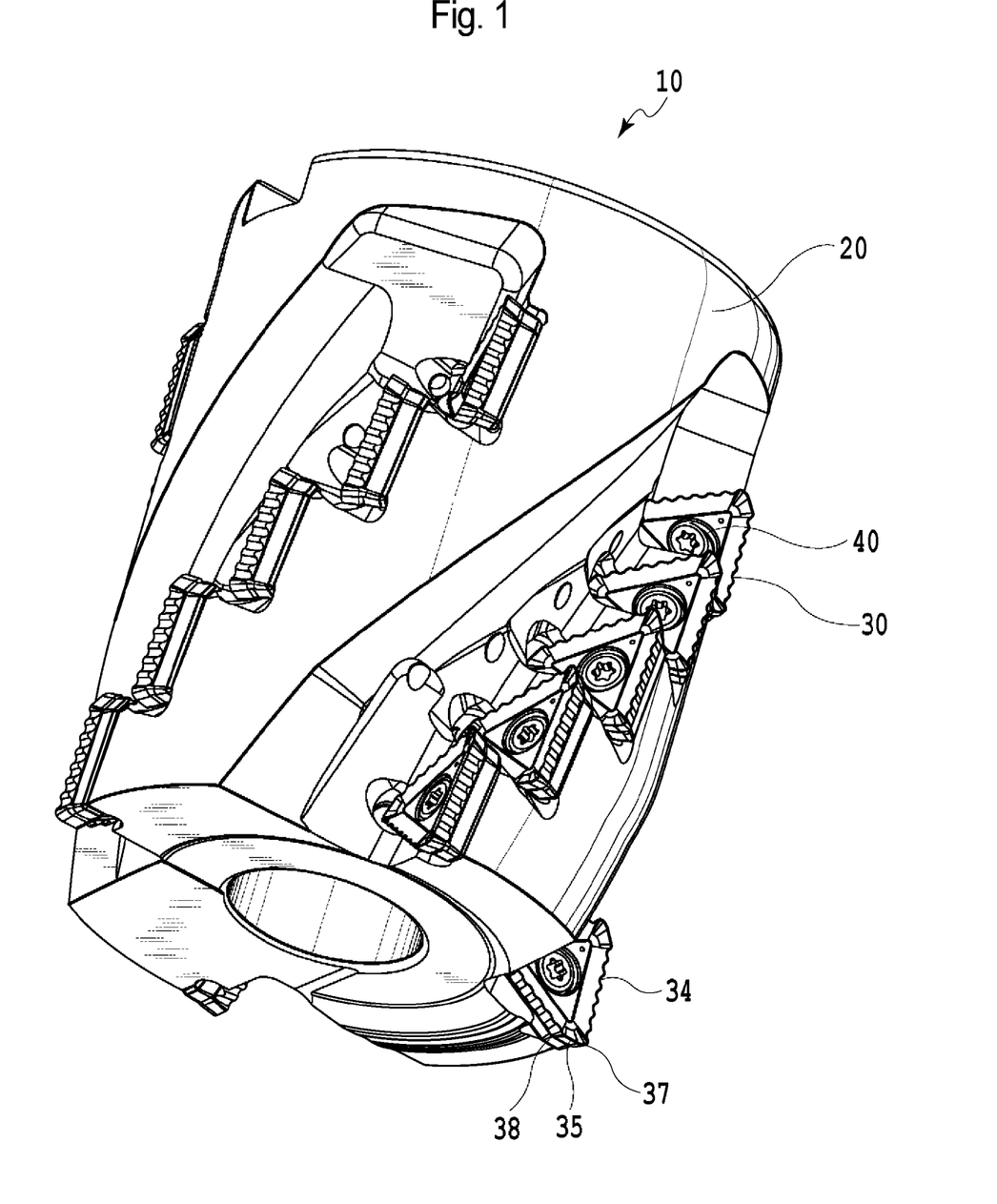
FIG. 1 is a perspective view showing an indexable rotary cutting tool according to an embodiment of the present invention.
Figure 2:
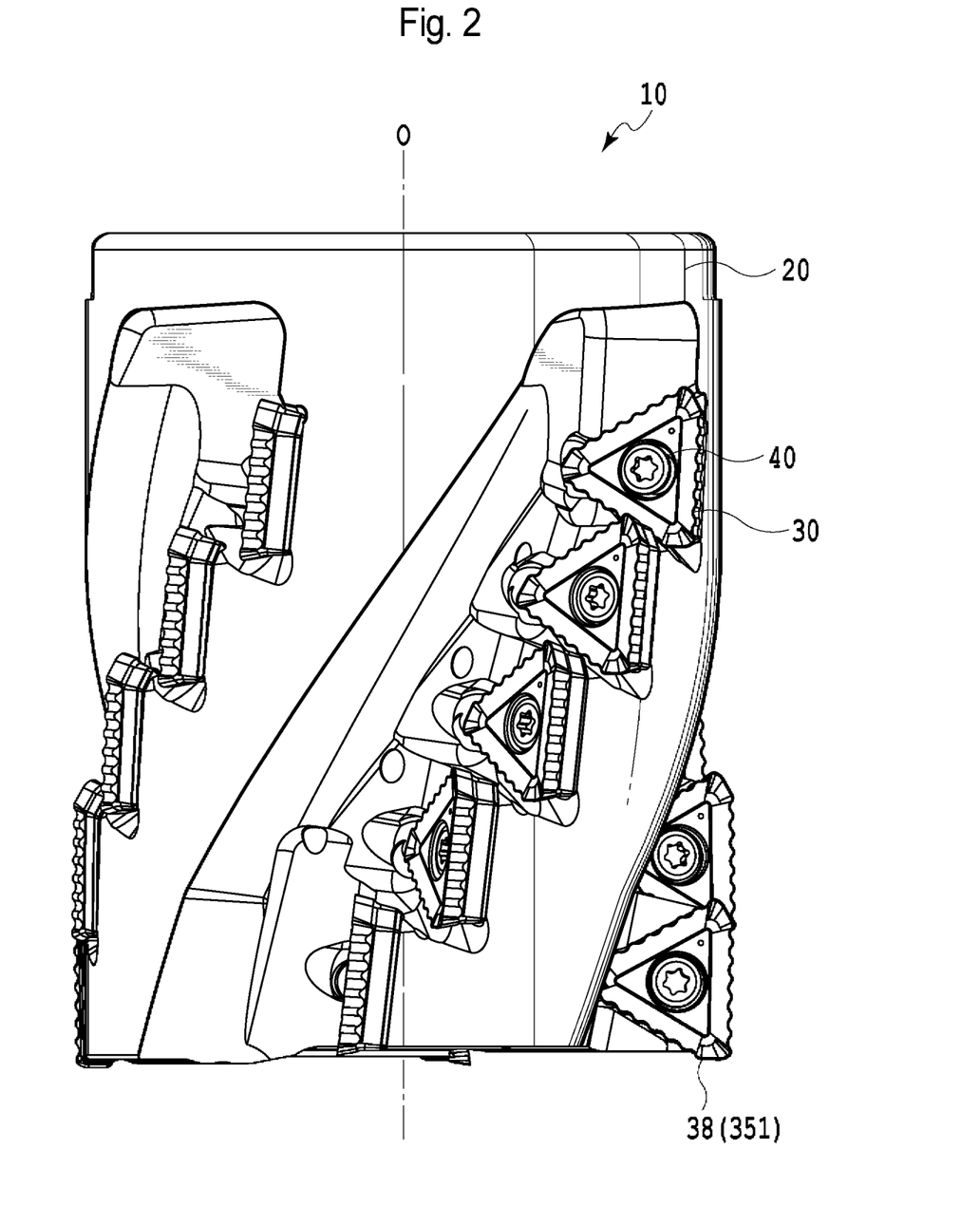
FIG. 2 is a side view showing the indexable rotary cutting tool of FIG. 1.

An indexable rotary cutting tool 10 according to the present embodiment is basically constituted by: a substantially cylindrical tool body 20 having a plurality of insert seats 28; and a plurality of cutting inserts 30 mounted on the insert seats 28, as shown in FIGS. 1 and 2. The indexable rotary cutting tool 10 of the present embodiment is sometimes referred to as a roughing cutter.

Figure 3:
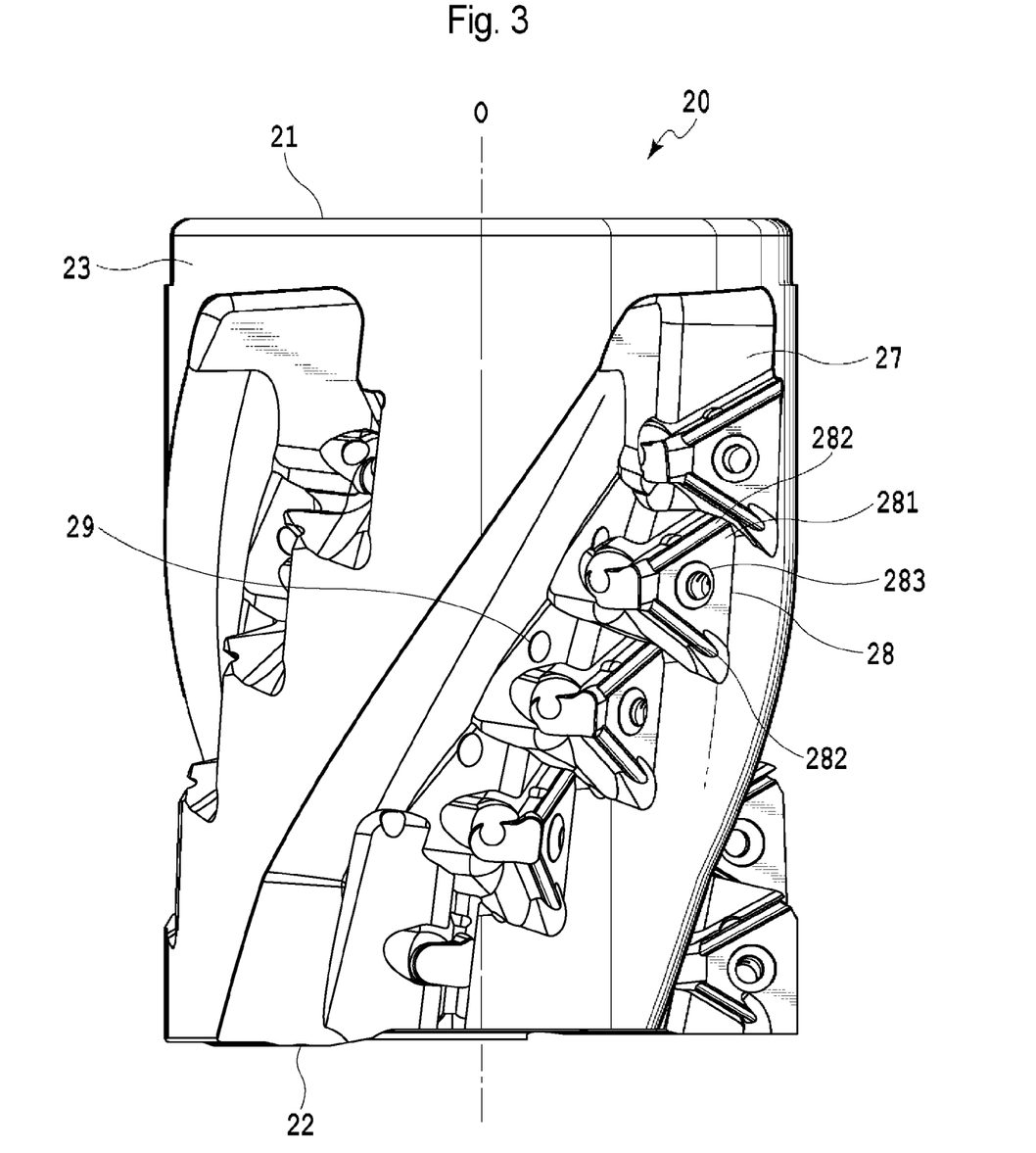
FIG. 3 is a side view showing a tool body used in an embodiment of an indexable rotary cutting tool according to the present invention.
Figure 4:
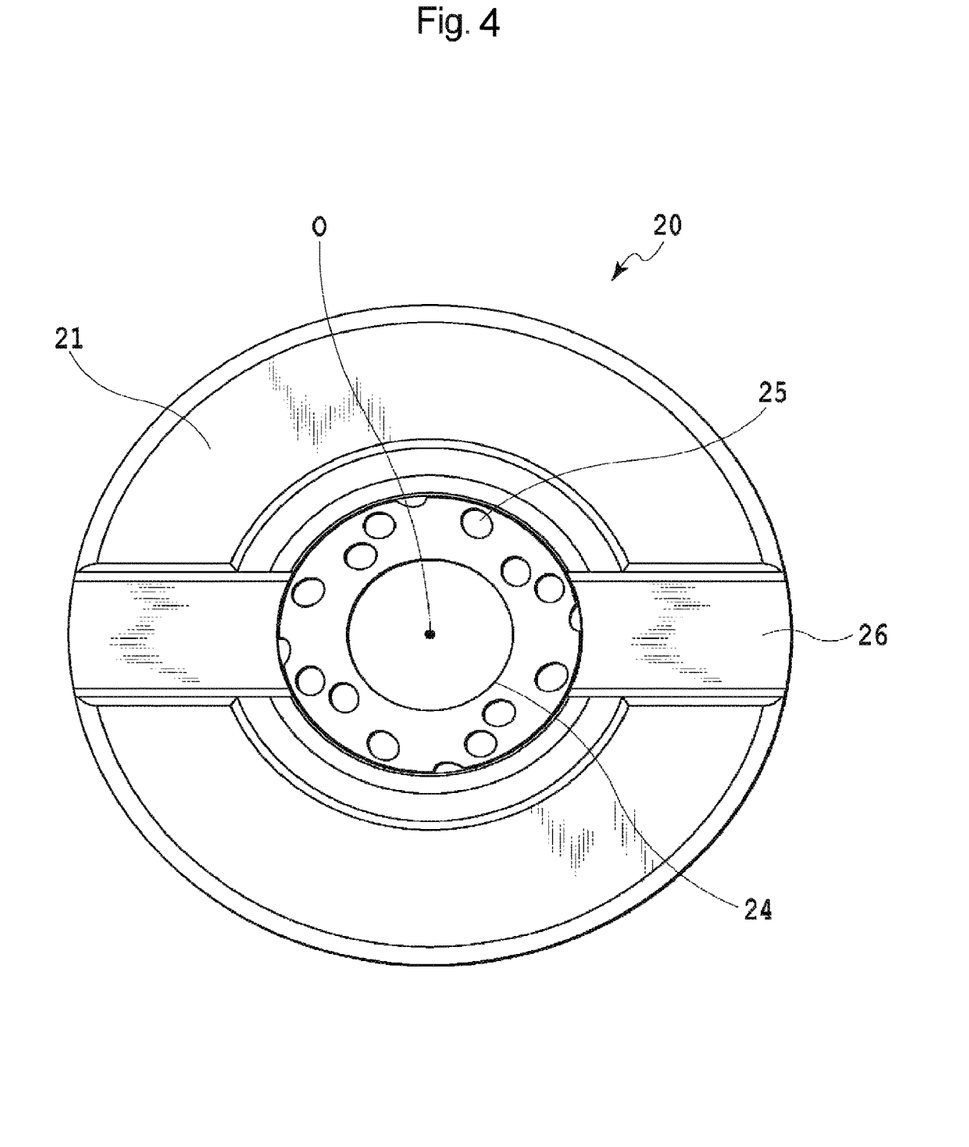
FIG. 4 is a top view showing the tool body of FIG. 3 from its proximal end side.
Figure 5:
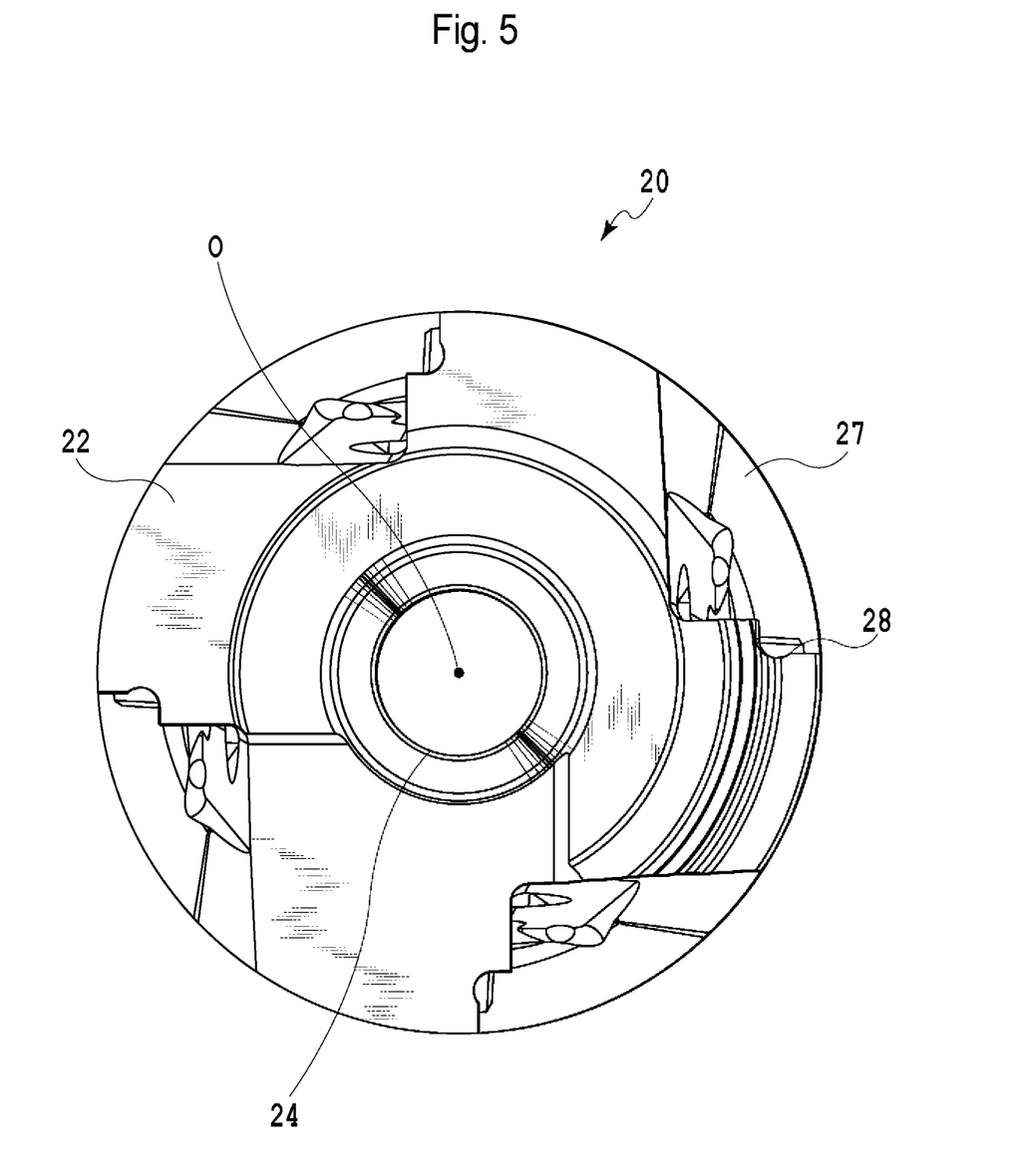
FIG. 5 is a bottom view showing the tool body of FIG. 3 from its distal end side.

As shown in FIGS. 3-5, the tool body 20 has a cylindrical shape including a substantially circular first end surface 21, a second end surface 22 arranged so as to oppose the first end surface 21 and having a substantially circular shape similarly to the first end surface 21, and a peripheral surface 23 connecting these end surfaces 21, 22. The tool body 20 has a rotational axis O passing through a center point of the first end surface 21 and a center point of the second end surface 22. The indexable rotary cutting tool 10 rotates with respect to the rotational axis O. The first end surface 21 is an end surface arranged at a proximal (rearward or trailing) end of the tool body 20 and is also referred to as a proximal end surface. Herein, the proximal end of the tool body 20 refers to an end to be mounted on a machine tool. The second end surface 22 is an end surface arranged at a distal (forward or leading) end of the tool body 20 and is also referred to as a distal end surface. Herein, the distal end of the tool body 20 refers to an end which is to be brought closer to a work piece.

The tool body 20 is provided with a through hole 24 formed so as to extend from the first end surface 21 to the second end surface 22 along the rotational axis O and a plurality of coolant supply holes 25 through which coolant flows. An attachment bolt to be used for fixing the tool body 20 to an arbor in the machine tool is inserted into the through hole 24. The first end surface 21 is provided with an opening of the through hole 24, openings of the coolant supply holes 25, and a key groove 26 for transferring a motive force from the main shaft of the machine tool. The second end surface 22 is provided with an opening of the through hole 24 and notches resulting from the provision of the insert seats 28.

A plurality of grooves 27 is formed in a spiral manner in the peripheral surface 23 between the first end surface 21 and the second end surface 22 of the tool body 20. The grooves 27 are formed so as to be twisted counterclockwise from the proximal end toward the distal end, as viewed from the distal end surface of the tool body 20. The grooves 27 start in the vicinity of the first end surface 21 of the tool body 20 and reach the second end surface 22. Although four grooves 27 are provided in the present embodiment, the number of grooves 27 is not limited thereto and any number of grooves may be provided, as long as there are one or more grooves. The plurality of insert seats 28 is formed in areas of the grooves 27 facing forward in the tool rotating direction. In the present embodiment, although five insert seats 28 are provided in one groove 27, the number of insert seats 28 is not limited thereto and two or more insert seats 28 may be provided in one groove 27. On the other hand, a plurality of coolant ejection ports 29 for ejecting the coolant are provided in areas of the grooves 27 facing opposite to the tool rotating direction. The coolant ejection ports 29 communicate with the coolant supply holes 25. The number, arrangement, etc. of the coolant ejection ports 29 and the coolant supply holes 25 may be changed as appropriate, in accordance with a desired cooling performance, etc.

In a common groove 27, in a side view of the tool body 20, the insert seat 28 located closest to the distal end of the tool is defined as a first segment, the insert seat 28 next to the first segment is defined as a second segment, the insert seat 28 next to the second segment is defined as a third segment, the insert seat 28 next to the third segment is defined as a fourth segment, and the insert seat 28 closest to the proximal end is defined as a fifth segment (the uppermost segment).

As shown in FIG. 3, the insert seat 28 is basically constituted by a bottom surface 281 that is brought into contact with a lower surface (seating surface) 32 of the cutting insert 30 and two side surfaces 282 that are brought into contact with a peripheral surface (restraining surface) 33 of the cutting insert 30. The bottom surface 281 of the insert seat has a generally similar shape to the shape of the seating surface 32 of the cutting insert 30 to be attached thereto. Although the shape is substantially triangular in the present embodiment, the shape is not limited thereto. The bottom surface 281 is provided with a fixture hole 283 at substantially the center thereof for fixing the cutting insert 30 onto the insert seat 28 by, for example, screwing. Specifically, although the fixture hole 283 in FIG. 3 is shown in a simplified manner, an inner surface of the actual fixture hole 283 is provided with a female thread. The shapes of the bottom surface 281 and the side surfaces 282 of the insert seat 28, as well as the positional relationship therebetween, may be changed as appropriate in accordance with the shape, etc. of the cutting insert to be mounted thereon.

Figure 6:
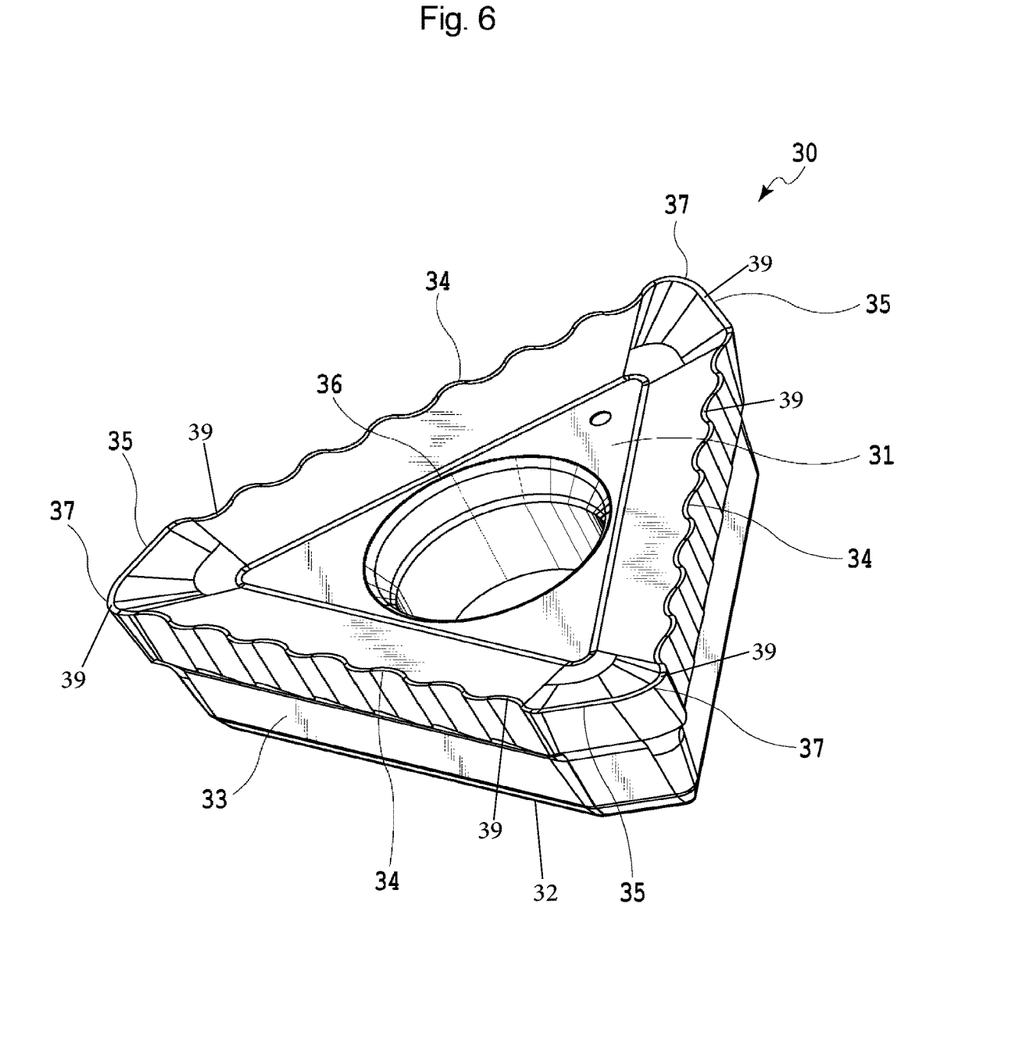
FIG. 6 is a perspective view showing a cutting insert used in an embodiment of an indexable rotary cutting tool according to the present invention.
Figure 7:
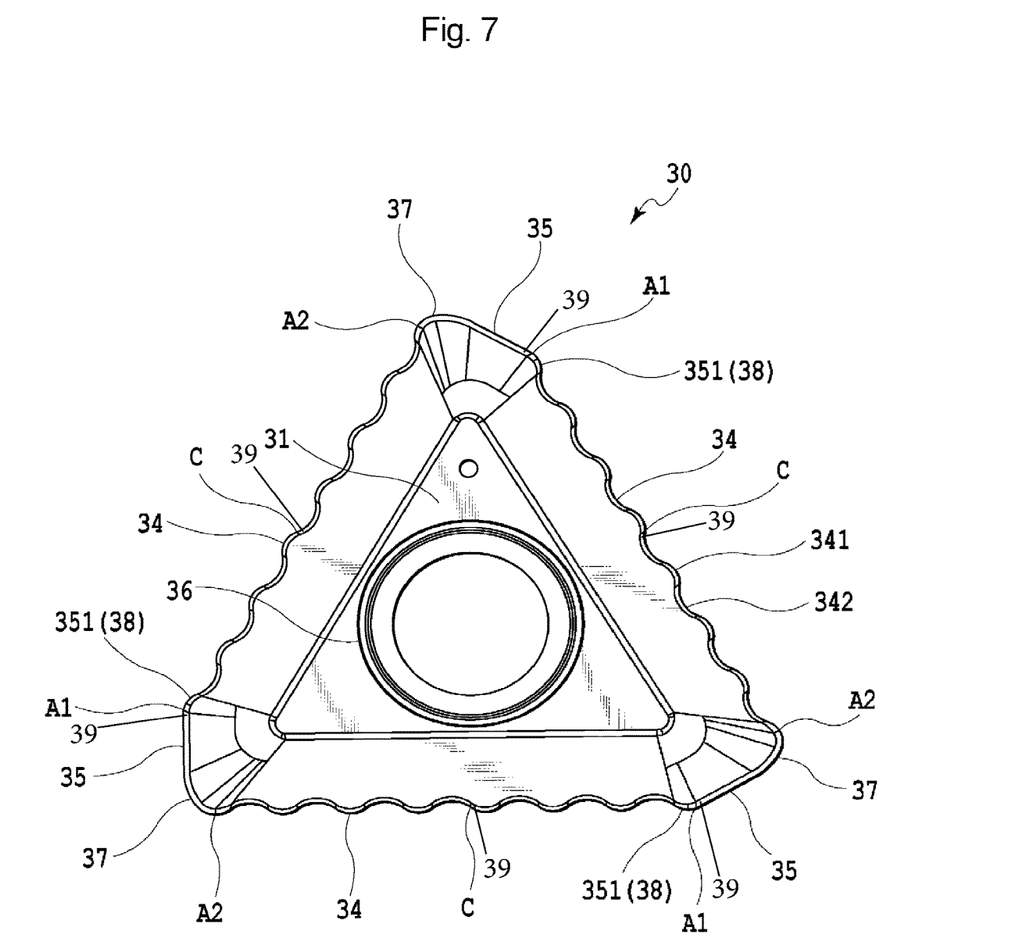
FIG. 7 is a top view showing the cutting insert of FIG. 6.

As shown in FIGS. 6 and 7, the cutting insert 30 used in the present embodiment is basically constituted by: an upper surface 31 whose basic contour is a substantially regular triangle; a lower surface 32 arranged so as to oppose the upper surface 31 and having a substantially triangular shape; and a peripheral surface 33 connecting the upper surface 31 and the lower surface 32. More specifically, the cutting insert 30 has a shape in which a part near each vertex of the triangle is cut off by a line substantially orthogonal to one side of the triangle. Thus, it can also be said that the upper surface 31 has a hexagonal shape of 120 degrees rotational symmetry formed by alternately-intersecting long sides and short sides. An angle formed by the upper surface 31 and the peripheral surface 33 is an acute angle, while an angle formed by the lower surface 32 and the peripheral surface 33 is a blunt angle. Accordingly, this cutting insert 30 is a so-called positive type. The upper surface 31 functions as a rake surface, the peripheral surface 33 functions as a flank or restraining surface, and the lower surface 32 functions as a seating surface. An attachment hole 36 is formed so as to penetrate substantially the center of the upper surface 31 and the lower surface 32.

Part of intersecting edges between the upper surface 31 and the peripheral surface 33 is provided with cutting edges. Specifically, major cutting edges 34 are formed on long side portions and minor cutting edges 35 are formed on short side portions. Further, a corner cutting edge 37 is formed on each corner at which the long side portion and the short side portion intersect with each other substantially at a right angle. Accordingly, since the cutting insert 30 of the present embodiment has three sets of a major cutting edge 34, a minor cutting edge 35 and a corner cutting edge 37, by rotating the cutting insert by 120 degrees and attaching it onto the insert seat 28 to use every set of cutting edges, a single cutting insert 30 can perform cutting three times.

However, the shape and configuration of the cutting insert 30 used for the indexable rotary cutting tool 10 according to the present invention are not limited thereto and may be changed as appropriate. For example, the cutting insert 30 may be of a negative-type in which the peripheral surface 33 intersects with the upper surface 31 and the lower surface 32 at 90 degrees. In such case, both the upper surface and the lower surface are formed in a congruent shape and, if the lower surface 32 is also provided with cutting edges, then the cutting insert is able to perform cutting six times in total by inverting the upper surface and the lower surface. The basic contour of the cutting insert may be other polygonal shapes, such as quadrangles and pentagons.

In the top view of the cutting insert 30 (FIG. 7), the major cutting edges 34 are formed in a wave shape. The "wave shape" as used herein refers to a shape formed by alternately connecting outwardly-curved cutting edge portions 341 that are curved like arcs toward the outside of the cutting insert 30 and inwardly-curved cutting edge portions 342 that are curved like arcs toward the inside of the cutting insert 30, in the top view of the cutting insert 30. However, all portions of the wave shape do not necessarily have to be arc-like curved portions and a part thereof may be formed linearly.

In the present embodiment, the major cutting edge 34 is formed in a wave shape throughout its length and formed in a sine wave. A portion of the peripheral surface 33 that is adjacent to the wave-shape major cutting edge 34 is also formed in a wave shape corresponding to the wave shape of the major cutting edge 34. In such wave-shape cutting edge, since only peak portions (the outwardly-curved cutting edge portions 341) are basically involved in cutting, chips are separated into small pieces. In addition, since only part of the cutting edge is involved in cutting, cutting resistance can be reduced. Thus, such cutting insert is suitable for a tool that forms large depth of cut and thereby discharges a large amount of chips and has a high cutting resistance, such as a roughing cutter.

In the cutting insert 30 according to the present embodiment, the major cutting edge 34, the corner cutting edge 37 and the minor cutting edge 35 along the respective sides of the triangle are connected in the order mentioned so as to form a set of cutting edges, as described above. Accordingly, a minor cutting edge 35 in a certain set is connected to another major cutting edge 34 in an adjacent set. A connecting part A1 between the minor cutting edge 35 in the certain set and the major cutting edge 34 in the adjacent set and a peripheral part of the connecting part A1 also function as an inner cutting edge 38. The "inner cutting edge" refers to a cutting edge that does not function in a normal lateral feeding (a feeding in a plane orthogonal to the axis of the tool) but is used when the tool is fed also in the axial direction of the tool, as in ramp cutting. In general, in a state in which the cutting insert 30 is mounted on the tool body as shown in FIG. 1, in the minor cutting edge 35 provided in the cutting insert located closest to the distal end and involved in cutting, a portion that is provided on a side opposite to the side to which the corner cutting edge 37 is connected serves as the inner cutting edge 38.

In the present embodiment, a cutting edge portion that may serve as the inner cutting edge 38 is a cutting edge portion that extends from the connecting part A1 between the minor cutting edge 35 in a certain (operative) set and the major cutting edge 34 in the adjacent set by a certain length toward the major cutting edge 34, as shown in FIG. 7. In other words, in the outwardly-curved cutting edge portions 341 of the major cutting edge 34, a part in the vicinity of an outwardly-curved cutting edge portion 351 located closest to an end (connecting part A1) also serves as the inner cutting edge. In addition, the outwardly-curved cutting edge portion 351 located closest to the end has a shape in which the position that is projected outermost in the top view is the connecting point A1 between the major cutting edge 34 and the minor cutting edge 35 belonging to the operative set of cutting edges, i.e., a shape that ends at the highest point (the middle point of the peak).

In the cutting insert 30 according to the present embodiment, lands 39 are formed on all the cutting edges 34, 35 and 37, and the width and angle of these lands are not constant. The land width and the land angle are constant in areas extending from the center point C of the major cutting edge 34 and before reaching the ends (i.e., the connecting point A1 between the major cutting edge 34 and the minor cutting edge 35 of the adjacent set and a connecting point A2 between the major cutting edge 34 and the corner cutting edge 37 of the same set) of the major cutting edge 34. Specifically, the land width is 0.15 mm and the land angle is 5°. On the other hand, the land width and the land angle vary in areas extending from points that are located slightly on the center point C side with respect to the respective connecting points A1, A2 to the connecting points A1, A2, in the major cutting edge 34. In such areas, the land width varies so as to become larger and the land angle varies so as to become smaller, from the center point C side toward the connecting points A1, A2. At the connecting points A1, A2, the land width becomes the largest and the land angle becomes the smallest.

Specifically, at the connecting points A1, A2, the land width is 0.2 mm and the land angle is 0°. The land width and the land angle of the lands 39 in the corner cutting edge 37 and the minor cutting edge 35 are the same, throughout their lengths, as the land width and the land angle at the connecting points A1, A2 between such corner cutting edge 37 and minor cutting edge 35 and the major cutting edge 34. Accordingly, the land width is 0.2 mm and the land angle is 0° in the minor cutting edge 35 and the major cutting edge 34.

Such cutting insert 30 is mounted on the insert seat 28 of the tool body 20 by a fastening screw 40. At this time, the lower surface 32 of the cutting insert 30 is brought into contact with the bottom surface 281 of the insert seat 28. In addition, the peripheral surfaces 33 of the cutting insert 30 are brought into contact with the side surfaces 282 of the insert seat 28. At this time, the cutting insert 30 is mounted so as to be arranged in positional relationships in which the major cutting edge 34 is parallel to the peripheral surface 23 of the tool body 20 on the peripheral surface 23 side and the minor cutting edge 35 is parallel to a distal end surface of the tool body 20 on the distal end surface side, as shown in FIG. 2. A wedge, a presser piece, etc. can be used, other than the fastening screw 40, to fix the cutting insert 30. However, by forming the attachment hole 36 so that the diameter of its end parts is larger than that of its central part and bringing a head part of the fastening screw 40 into contact with stepped portions formed by such larger diameter parts of the attachment hole to thereby fix the cutting insert 30 to the tool body 20, it is possible to eliminate projections projected in the groove 27. Thus, the discharging efficiency of chips can be enhanced.

The cutting edges 34, 35, 37 of the cutting insert 30 can be made of hard materials, such as a cemented carbide, cermet, ceramic, a material obtained by applying some coating to these materials, an ultrahigh-pressure sintered body containing diamond or cubic boron nitride, and a material obtained by applying some coating to the ultrahigh-pressure sintered body containing cubic boron nitride. The remaining parts other than the cutting edges 34, 35, 37 of the cutting insert 30 are preferably made of similarly hard materials.

In the present embodiment, five cutting inserts 30 are mounted per one groove 27. In the first segment cutting insert 30 arranged closest to the distal end of the tool, the major cutting edge 34 thereof is involved in cutting of a side surface of a work piece, the minor cutting edge 35 thereof is involved in cutting of a bottom surface of the work piece and the corner cutting edge 37 thereof is involved in cutting of a corner of the work piece. On the other hand, in the second to fifth segment cutting inserts 30, the minor cutting edges 35 and the corner cutting edges 37 are not involved in cutting of the work piece, although the major cutting edges 34 thereof are involved in cutting of the side surface of the work piece. In other words, the minor cutting edges 35 and the corner cutting edges 37 of the second to fifth segment cutting inserts 30 are arranged so as not to be projected with respect to the rotational trajectories of the major cutting edges 34 of the corresponding cutting inserts 30 in the other grooves.

The cutting inserts 30 are arranged in an overlapped manner in one groove 27 in the direction of the rotational axis O in the side view of the tool body 20. More specifically, the major cutting edges 34 of adjacent cutting inserts 30 in one groove are arranged such that their cutting portions are overlapped in the direction of the rotational axis O. Since the insert seats 28 are formed in a stair-like shape in the spiral groove 27 as shown in FIG. 2, such overlapped arrangement of the cutting inserts 30 can be achieved.

The cutting inserts 30 are arranged so as to be partially overlapped in the direction of the rotational axis O in one groove 27, as described above. More specifically, the cutting inserts 30 have the following characteristic configurations.

Figure 8:
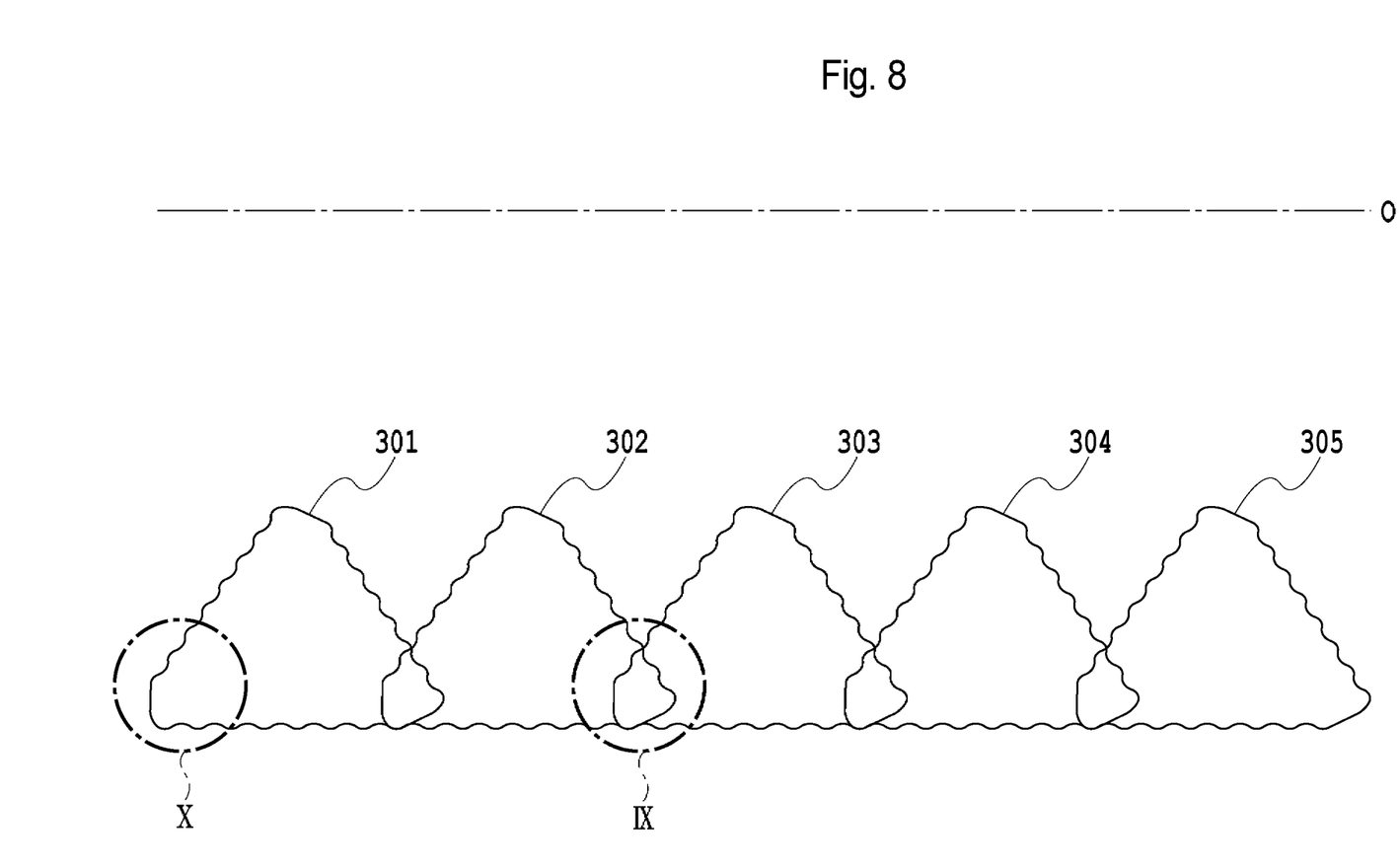
FIG. 8 is a diagram showing, by projection, the rotational trajectories of five cutting inserts, from the cutting insert located closest to a distal end to the cutting insert located closest to a proximal end, at a certain angular position in a tool rotating direction, in order to explain the rotational trajectories of wave shape major cutting edges of all the cutting inserts arranged in one groove of the tool body of FIG. 3.

FIG. 8 shows a state in which rotational trajectories 301-305 of five cutting inserts, i.e., from the cutting insert located closest to the distal end to the cutting insert located closest to the proximal end, are projected at a certain angular position in the tool rotating direction. As shown in FIG. 8, as viewed from the front side of the rotational trajectories formed by the major cutting edges 34 of the respective cutting inserts 30 when the indexable rotary cutting tool 10 according to the present embodiment is rotated around the rotational axis O, the cutting inserts 30 are arranged so as to be overlapped in the direction of the rotational axis O such that the phases of the waves of the rotational trajectories 301-305 formed by the adjacent cutting inserts 30 coincide with each other. In other words, the cutting inserts 30 are arranged such that the waves of the rotational trajectories formed by the major cutting edges 34 of the cutting inserts 30 are formed continuously between the adjacent cutting inserts 30.

Figure 9:
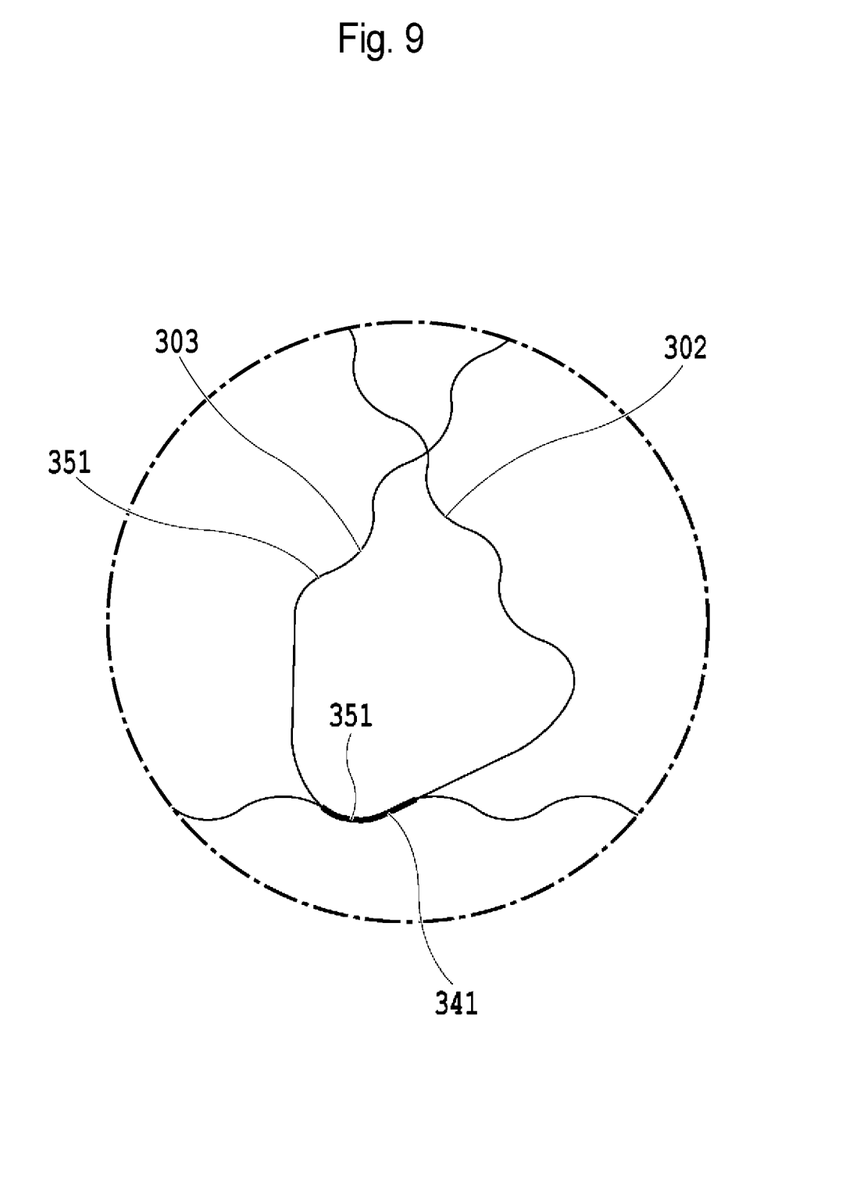
FIG. 9 is a diagram showing portion IX in FIG. 8 in an enlarged manner, in order to explain overlapping between rotational trajectories of adjacent cutting inserts in one groove.

In the present embodiment, as shown in FIG. 9, which shows portion IX in FIG. 8 in an enlarged manner, the cutting inserts 30 are arranged such that, in the rotational trajectories formed by the operative major cutting edges 34 (the rotational trajectories 302 and 303 formed by the second segment cutting insert and the third segment cutting insert, respectively in FIG. 9) only the rotational trajectories formed by the respective outwardly-curved cutting edge portions 341 located closest to the ends of the operative major cutting edge 34 are overlapped in the direction of the rotational axis O, in each groove 27. Thus, in a given groove 27, adjacent inserts 30 are mounted such that the rotational trajectory of an outwardly-curved cutting edge portion 341 at the trailing (rearward, proximal) end of the leading (forward, distal) insert coincides in phase with rotational trajectory of an outwardly-curved cutting edge portion 341 at the leading (forward, distal) end of the trailing (rearward, proximal) insert. This relates to, more precisely, the relationship between the rotational trajectory of the outwardly-curved cutting edge portion 351 of a cutting insert located relatively closer to the distal (forward or leading) end and the rotational trajectory of the outwardly-curved cutting edge portion 341 connected to the corner cutting edge of a cutting insert located relatively closer to the proximal (rearward or trailing) end. In the present embodiment, the same relationship is applied to all the adjacent cutting inserts 30 in all the grooves 27.

Figure 10:
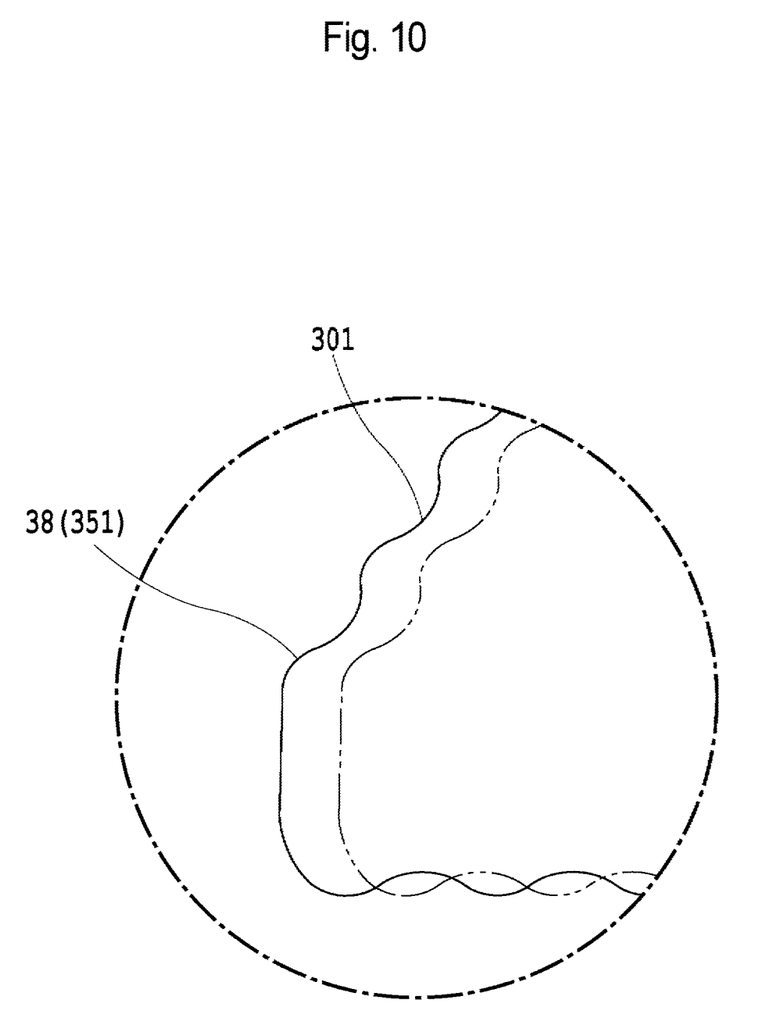
FIG. 10 is a diagram showing portion X in FIG. 8 in an enlarged manner, in order to explain overlapping between rotational trajectories of circumferentially adjacent cutting inserts.

In addition, in the relationship between the adjacent grooves 27 in the circumferential direction of the tool, the cutting inserts 30 are arranged in such a way that the phases of the waves of the rotational trajectories of the cutting tool 10 are shifted in the direction of the rotational axis O of the tool, so that the phases of the waves of the rotational trajectories of the grooves 27 do not coincide with each other when the rotational trajectories of all the grooves 27 are superimposed. Specifically, as shown in FIG. 10, which shows portion X in FIG. 8 in an enlarged manner, in the relationship between the first segment cutting inserts located closest to the distal end in the grooves 27 that are adjacent to each other in the circumferential direction, the phase of the wave of the rotational trajectory shown by the broken line is shifted with respect to the rotational trajectory 301 shown in the solid line of the circumferentially adjacent cutting insert.

Next, the effects and advantages of the indexable rotary cutting tool 10 according to the present embodiment will now be described.

The following advantages can be obtained by configurations in which: the cutting inserts 30 each have the major cutting edge 34 formed in a wave shape in plan view; the cutting inserts 30 are arranged such that, in the rotational trajectories formed by the major cutting edges 34 of the respective cutting inserts 30 when the indexable rotary cutting tool 10 is rotated around the rotational axis O, the phases of the waves of the rotary trajectories formed by the cutting inserts 30 that are adjacent to each other along the direction of the rotational axis O coincide with each other in one groove 27; and at least some of the cutting inserts 30 are arranged such that the rotational trajectories formed by part of cutting edge portions from among the rotational trajectories formed by the major cutting edges 34 are overlapped with each other in the direction of the rotational axis O, as in the indexable rotary cutting tool 10 according to the present embodiment.

The configurations in which the phases of the wave-like rotational trajectories of the adjacent cutting inserts 30 coincide with each other and the rotational trajectories formed by part of the cutting edge portions are overlapped indicate that at least the outwardly-curved cutting edge portions 341 located closest to an end (the connecting point A1) of the major cutting edges 34 are overlapped in the circumferential direction in the present embodiment. In the cutting insert 30 of the present embodiment, the outwardly-curved cutting edge portion 351 of the major cutting edge 34 can also serve as the inner cutting edge 38. Thus, in the cutting insert 30 arranged closest to the distal end of the tool, only such outwardly-curved cutting edge portion 351 is used for cutting twice, i.e., the cutting of the side surface and the cutting of the bottom surface of a work piece. In other words, the outwardly-curved cutting edge portion 351 is used as the major cutting edge 34 and is also used as the inner cutting edge 38.

Accordingly, the outwardly-curved cutting edge portion 351 is subjected to quite a large load and is prone to breakage. However, by employing the configurations in the present embodiment, such problems can be suppressed. This is because, in an area corresponding to the outwardly-curved cutting edge portion 351 in the rotating direction, there are twice as many cutting edges as in the other cutting edge portions. In other words, an area in the vicinity of the outwardly-cutting edge portion 351 is overlapped with an area in the vicinity of the outwardly-curved cutting edge portion 341 at an end of the adjacent cutting insert and, further, since the tool body 20 is provided with four grooves, from among the major cutting edges 34, four cutting edges are used for cutting in areas corresponding to the other cutting edge portions in the rotating direction whereas eight cutting edges are used for cutting in the area corresponding to the overlapped outwardly-curved cutting edge portions 351 in the rotating direction. Accordingly, since the thickness of cut per cutting edge is small in such area, the cutting load can be greatly reduced. As described above, by greatly reducing the load applied to the outwardly-curved cutting edge portions 341 that are used for cutting twice, it is possible to significantly suppress fracture in such portion that is used also as the inner edge 38.

In the present embodiment, the cutting inserts 30 are arranged so as to be overlapped in the direction of the rotational axis O such that only the rotational trajectories formed by the outwardly-curved cutting edge portions 341 located closest to the end of the major cutting edges 34 (i.e., the outwardly-curved cutting edge portion 351 corresponding to the inner cutting edge 38 of a cutting insert located relatively closer to the distal end and the outwardly-curved cutting edge portion 341 connected to the corner cutting edge of a cutting insert located relatively closer to the proximal end) coincide with each other, from among the rotational trajectories formed by the major cutting edges 34. However, the arrangement is not limited thereto. Specifically, the cutting inserts 30 may be arranged such that the rotational trajectories formed by more than one outwardly-curved cutting edge 341 from the end are overlapped with each other. However, in order to maximize the depth of cut provided by the entire tool, the arrangement in which only the portions located closest to the end are overlapped is preferable.

Although all the adjacent cutting inserts 30 are overlapped with each other in all the grooves 27 in the present embodiment, the arrangement is not limited thereto. Specifically, the effect of suppressing fracture in the outwardly-curved cutting edge portions 351 can be achieved to some extent even by a configuration in which only some of the adjacent inserts 30 in some of the grooves 27 are overlapped with each other. However, in order to maximize the fracture suppressing effect, the arrangement in which all the adjacent cutting inserts 30 are overlapped with each other in all the grooves 27 is preferable. The cutting insert 30 whose outwardly-curved cutting edge portion 351 serves as the inner cutting edge 38 is only the cutting insert located closest to the distal end. This is because, when all the cutting inserts in the tool are replaced at the same time, the cutting insert that has been located closest to the distal end is replaced with the cutting insert that has been located closest to the proximal end for use.

In the grooves 27 that are adjacent to each other in the circumferential direction of the tool, the cutting inserts 30 are arranged such that the phases of the waves of the rotational trajectories are shifted in the direction of the tool rotational axis O and such that, when the rotational trajectories of all the grooves 27 are superimposed, the phases of the waves of the rotational trajectories of such grooves 27 do not coincide with each other. With such arrangement, the height difference between the peak portions and valley portions of the wave-like rotational trajectories of the major cutting edges 34 is reduced when all the grooves 27 are superimposed, the amount of portions that remain uncut due to the valley portions can be reduced and the surface roughness of a worked surface of a work piece can be enhanced.

The lands 39 are formed in all of the major cutting edges 34, the minor cutting edges 35 and the corner cutting edge 37 in the cutting inserts 30 and the land width at the connecting point A1 between the major cutting edge 34 and the minor cutting edge 35 is larger than the land width at the center point C of the major cutting edge 34 while the land angle at the connecting point A1 is smaller than the land angle at the center point C. With such configuration, the strength of the portion (the outwardly-curved cutting edge portion 351) of the major cutting edge 34 that corresponds to the inner cutting edge 38 can be enhanced and fracture can be further suppressed.

In addition, in the abovementioned configuration in which the phases of the waves of the rotational trajectories of the grooves 27 are shifted from each other in the direction of the tool rotational axis O, since only the inner cutting edge 38 of the cutting insert 30 located closest to the distal end of the tool in each groove 27 is first brought into contact with the bottom surface of a work piece, the number of cutting edges involved in cutting is small in this state. For example, in all the grooves 27, an area corresponding to the inner cutting edge 38 of the cutting insert 30 located closest to the distal end of the tool contains one cutting edge, an area corresponding to the inner cutting edge 38 of the cutting insert 30 located second closest to the distal end contains two cutting edges, and an area corresponding to the inner cutting edge 38 of the cutting insert 30 located third closest to the distal end contains three cutting edges. Accordingly, cutting resistances applied to these inner cutting edges 38 are larger than the cutting resistance applied to the normal inner cutting edge, i.e., an area corresponding to the inner cutting edge 38 of the cutting insert 30 located fourth closest to the distal end of the tool and containing four cutting edges, and thus, the configuration of strengthening the lands as described above is effective. At the same time, in the other portions of the major cutting edge 34 (the portions that are not used for cutting twice), the lands 39 are kept sharp, so that the cutting performance can be maintained.

In addition, the land width and land angle of the minor cutting edge 35 are preferably equal to the land width and land angle at the connecting point A1. Such configuration can enhance the strength of the minor cutting edge 35 to which a large load is applied in the configuration in which the grooves 27 are arranged such that the phases of the waves of their rotational trajectories are shifted from each other in the direction of axis O of the tool, as described above.

The shape of the cutting inserts 30 used in the present invention does not have to be limited to the triangular shape in plan view. In other words, other shapes may be employed, as long as the cutting insert 30 has the configuration in which part of the major cutting edge 34 is also used as the inner cutting edge 38.

Although representative embodiments of the present invention have been described above, various modifications may be made to the present invention and any replacement and modification may be made without departing from the spirit and scope of the invention defined in the scope of the claims of the present application.

What is claimed is:

1. An indexable rotary cutting tool comprising: a substantially cylindrical tool body having a rotational axis; and cutting inserts mounted on the tool body, in which a plurality of grooves is formed in a peripheral surface of the tool body, a plurality of insert seats is formed in the grooves, and the cutting inserts are removably arranged onto the insert seats, wherein:
the cutting inserts each have a rake surface and a flank intersecting with the rake surface, and a major cutting edge, a corner cutting edge connected to the major cutting edge, and a minor cutting edge connected to the corner cutting edge, are formed in an intersecting edge between the rake surface and the flank;
the major cutting edge has a wave shape formed of alternately connecting outwardly-curved cutting edge portions and inwardly-curved cutting edge portions of the major cutting edge as viewed from a direction facing the rake surface;
the cutting inserts are arranged:
such that, in rotational trajectories formed by the major cutting edges of the respective cutting inserts when the indexable rotary cutting tool is rotated around the rotational axis, phases of waves of rotational trajectories formed by cutting inserts that are adjacent to each other in a direction along the rotational axis in one groove coincide with each other, and
such that at least some of the cutting inserts are arranged such that, from among the rotational trajectories formed by the major cutting edges, rotational trajectories formed by part of cutting edge portions are overlapped with each other in a direction of the rotational axis; and
in each of the grooves, the at least some cutting inserts are arranged such that, from among the rotational trajectories formed by the major cutting edges, only rotational trajectories formed by outwardly-curved cutting edge portions located closest to ends of the major cutting edges are overlapped with each other in the direction of the rotational axis.

2. The indexable rotary cutting tool according to claim 1, wherein, in all the grooves, all adjacent cutting inserts are arranged such that the rotational trajectories of ends of the adjacent cutting inserts are overlapped with each other in the direction of the rotational axis.

3. The indexable rotary cutting tool according to claim 1, wherein, in a relationship between the rotational trajectories of the cutting inserts arranged in grooves that are adjacent to each other in a circumferential direction of the tool body, the cutting inserts are arranged such that the phases of the waves of the rotational trajectories are shifted from each other in the direction of the rotational axis, and when the rotational trajectories of all the grooves are superimposed, the phases of the waves of the rotational trajectories of the grooves do not coincide with each other.

4. An indexable rotary cutting tool comprising: a substantially cylindrical tool body having a rotational axis; and cutting inserts mounted on the tool body, in which a plurality of grooves is formed in a peripheral surface of the tool body, a plurality of insert seats is formed in the grooves, and the cutting inserts are removably arranged onto the insert seats, wherein:
the cutting inserts each have a rake surface and a flank intersecting with the rake surface, and a major cutting edge, a corner cutting edge connected to the major cutting edge, and a minor cutting edge connected to the corner cutting edge, are formed in an intersecting edge between the rake surface and the flank;
the major cutting edge has a wave shape formed of alternately connecting outwardly-curved cutting edge portions and inwardly-curved cutting edge portions of the major cutting edge as viewed from a direction facing the rake surface;
the cutting inserts are arranged:
such that, in rotational trajectories formed by the major cutting edges of the respective cutting inserts when the indexable rotary cutting tool is rotated around the rotational axis, phases of waves of rotational trajectories formed by cutting inserts that are adjacent to each other in a direction along the rotational axis in one groove coincide with each other, and
such that at least some of the cutting inserts are arranged such that, from among the rotational trajectories formed by the major cutting edges, rotational trajectories formed by part of cutting edge portions are overlapped with each other in a direction of the rotational axis;

the minor cutting edge of the cutting insert is connected to a another major cutting edge different from said major cutting edge;

lands are formed in all of the major cutting edge the minor cutting edge, and the corner cutting edge;

a land width at a connecting point between said different major cutting edge and the minor cutting edge is larger than a land width at a center point in the different major cutting edge; and a land angle at the connecting point between the different major cutting edge and the minor cutting edge is smaller than a land angle at the center point in the different major cutting edge.

5. The indexable rotary cutting tool according to claim 4, wherein a land width and a land angle of the minor cutting edge are equal to the land width and the land angle at the connecting point.

6. An indexable rotary cutting tool comprising: a substantially cylindrical tool body having a rotational axis; and cutting inserts mounted on the tool body, in which a plurality of grooves is formed in a peripheral surface of the tool body, a plurality of insert seats is formed in the grooves, and the cutting inserts are removably arranged onto the insert seats, wherein:

the cutting inserts each have a rake surface and a flank intersecting with the rake surface, and a major cutting edge, a corner cutting edge connected to the major cutting edge, and a minor cutting edge connected to the corner cutting edge, are formed in an intersecting edge between the rake surface and the flank;

the major cutting edge has a wave shape formed of alternately connecting outwardly-curved cutting edge portions and inwardly-curved cutting edge portions of the major cutting edge as viewed from a direction facing the rake surface;

the cutting inserts are arranged:
such that, in rotational trajectories formed by the major cutting edges of the respective cutting inserts when the indexable rotary cutting tool is rotated around the rotational axis, phases of waves of rotational trajectories formed by cutting inserts that are adjacent to each other in a direction along the rotational axis in one groove coincide with each other, and such that at least some of the cutting inserts are arranged such that, from among the rotational trajectories formed by the major cutting edges, rotational trajectories formed by part of cutting edge portions are overlapped with each other in a direction of the rotational axis; and the cutting inserts have a substantially triangular shape as viewed from a direction facing the rake surface.

7. The indexable rotary cutting tool according to claim 6, wherein:

the major cutting edge is formed along each side of the substantially triangular shape of the cutting insert; and in the plurality of outwardly-curved cutting edge portions, an outwardly-curved cutting edge portion located at an end of the major cutting edge and connected to the minor cutting edge also serves as an inner cutting edge.

8. An indexable rotary cutting tool comprising:

a substantially cylindrical tool body having a rotational axis, a trailing end surface, a leading end surface and a peripheral surface;

a plurality of circumferentially spaced-apart grooves formed in the peripheral surface, each groove comprising a plurality of insert seats;

an indexable cutting insert removeably attached in each insert seat, each cutting insert having rake surface, an attachment hole formed in the rake surface around which the insert is indexable, and a plurality of sets of cutting edges, each set comprising a major cutting edge, a corner cutting edge connected to the major cutting edge, and a minor cutting edge connected to the corner cutting edge; wherein:

each major cutting edge comprises a plurality of spaced apart outwardly-curved cutting edge portions that are curved like arcs toward the outside of the cutting insert, in a top view of the cutting insert facing the rake surface and the attachment hole;

each cutting insert is attached such that an operative major cutting edge has a leading outwardly-curved cutting edge portion and a trailing outwardly-curved cutting edge portion;

in each groove, adjacent inserts are mounted such that a rotational trajectory of an outwardly-curved cutting edge portion at the trailing end of the leading insert coincides in phase with a rotational trajectory of an outwardly-curved cutting edge portion at the leading end of the trailing insert; and in adjacent grooves, the cutting inserts located closest to the distal ends of the adjacent grooves are arranged such that rotational trajectories of the inserts' leading outwardly-curved cutting edge portions do not coincide in phase.

9. The indexable rotary cutting tool according to claim 8, wherein:

each cutting insert has a substantially triangular shape as viewed from a direction facing the rake surface;

each cutting insert has three sets of cutting edges, one set of which is operative and has a major cutting edge extending along the peripheral side surface; and the major cutting edge of each set is formed along a corresponding side of the substantially triangular shape.

10. The indexable rotary cutting tool according to claim 9, wherein:

each groove has a plurality of cutting inserts seating therein, and rotational trajectories of overlapping outwardly-curved cutting edge portion belonging to adjacent cutting inserts within a groove coinciding in phase such that the rotational trajectory of said each groove forms a continuous wave.

11. The indexable rotary cutting tool according to claim 10, wherein:

when rotational trajectories of all the grooves are superimposed, the rotational trajectories of any two grooves do not coincide with each other in phase.

12. The indexable rotary cutting tool according to claim 9, wherein:

the minor cutting edge is connected to a major cutting edge belonging to an adjacent set of cutting edges;

lands are formed in the major cutting edge the minor cutting edge, and the corner cutting edge;

a land width at a connecting point between the minor cutting edge and the major cutting edge belonging to the adjacent set of cutting edges, is larger than a land width at a center point of the major cutting edge; and a land angle at the connecting point is smaller than a land angle at the center point of the major cutting edge.

13. The indexable rotary cutting tool according to claim 12, wherein a land width and a land angle of the minor cutting edge are equal to the land width and the land angle at the connecting point.

14. The indexable rotary cutting tool according to claim 9, wherein:
   the cutting inserts are mounted such that, during cutting operations when the cutting tool is moved in a lateral direction perpendicular to the rotational axis, an outwardly-curved cutting edge portion belonging to an adjacent set of cutting edges and connected to a minor cutting edge belonging to the operative set of cutting edges, does not participate in cutting.

* * * * *